United States Patent [19]
Bailey

[11] 3,770,262
[45] Nov. 6, 1973

[54] KITCHEN CUTTING BOARD
[76] Inventor: George E. Bailey, Cordaville Rd., Ashland, Mass. 01701
[22] Filed: Feb. 14, 1972
[21] Appl. No.: 226,002

[52] U.S. Cl............... 269/289, 269/302.1, 269/309
[51] Int. Cl............................................. B23q 3/00
[58] Field of Search.................. 269/289, 302.1, 13, 269/15, 16, 309-314; 83/761; 248/350

[56] References Cited
UNITED STATES PATENTS
| | | | |
|---|---|---|---|
| 1,734,853 | 11/1929 | Gurnea | 269/310 |
| 597,013 | 1/1898 | Miller | 83/761 |
| 3,116,919 | 1/1964 | Alth | 269/21 |
| 1,122,314 | 12/1914 | Schaefer | 269/313 |

FOREIGN PATENTS OR APPLICATIONS
| | | | |
|---|---|---|---|
| 569,535 | 5/1945 | Great Britain | 269/309 |
| 201,778 | 9/1908 | Germany | 269/309 |
| 169,337 | 5/1934 | Switzerland | 269/309 |

Primary Examiner—Othell M. Simpson
Assistant Examiner—Joseph T. Zatarga
Attorney—John E. Toupal

[57] ABSTRACT

Disclosed is a cutting board having threaded studs that extend through holes in a kitchen counter and accommodate nuts that secure the board in place. A gasket positioned between the board and counter top prevents entry of foreign matter therebetween.

11 Claims, 4 Drawing Figures

PATENTED NOV 6 1973 3,770,262

KITCHEN CUTTING BOARD

BACKGROUND OF THE INVENTION

The present invention relates generally to an accessory device for use in household kitchens and, more particularly, to a cutting board on which food products can be prepared prior to use.

The use in household kitchens of cutting boards during the preparation of foods is well known. Such boards are used for a variety of purposes including meat cutting, bread slicing, vegetable chopping, etc. In isolated cases, cutting boards are permanently mounted in a convenient position on a kitchen counter top near, for example, a sink, garbage disposal or stove. Such permanent installations typically entail securement of the cutting board to the counter base surface with suitable adhesives prior to the application of a finish ply such as Formica which must be cut to conform with the outer edge of the cutting board. Obviously, this procedure requires a significant degree of skill and is therefore relatively costly. For these reasons, permanently installed cutting boards are rarely used and then predominantly in expensive custom designed kitchens. The vast majority of cutting boards are portable units that are retained in a place of storage such as within a kitchen cabinet. For use, the board must be removed from its position of storage and positioned on the counter top at a location wherein its service is desired. Because of this cumbersome requirement for relocation, cutting boards available in kitchens are not always utilized and unnecessary damage is caused to expensive counter tops during certain acts of food preparation. In addition, the requirement for handling frequently leads to dropping of a cutting board and resultant breakage thereof.

The object of this invention, therefore, is to provide a relatively inexpensive cutting board that can be quickly and easily installed in any desired location on a kitchen counter top.

SUMMARY OF THE INVENTION

The present invention is characterized by the provision of a cutting board that quickly and easily can be demountably installed in any desired location on a kitchen counter top. In a preferred embodiment, the bottom surface of the cutting board possesses threaded studs that can be inserted into suitable holes through the counter top and thereby restrain relative movement therebetween in the plane defined by the counter top. Suitable securing means such as wing nuts engage the threaded studs and contact the underside of the counter top so as to secure the cutting board in place. However, if removal is desired for any reason, the wing nuts are easily detached to permit withdrawal of the studs from the accommodating holes in the counter top.

A feature of the invention is the provision with a cutting board of the type described above of a sealing gasket which is installed between the counter top and board so as to prevent the entry of foreign matter therebetween. Preferably, the gasket is an annular member having an outer peripheral edge conforming to the outer edge of the cutting board. By providing the gasket with apertures aligned with the cutting board studs, it provides the additional function of a template for use in drilling the holes required for installation on a counter top.

DESCRIPTION OF THE DRAWINGS

These and other objects and features of the present invention will become more apparent upon a perusal of the following description taken in conjunction with the accompanying drawings wherein.

DESCRIPTION OF THE PREFERRED EMBODIMENTS

Figure 1:
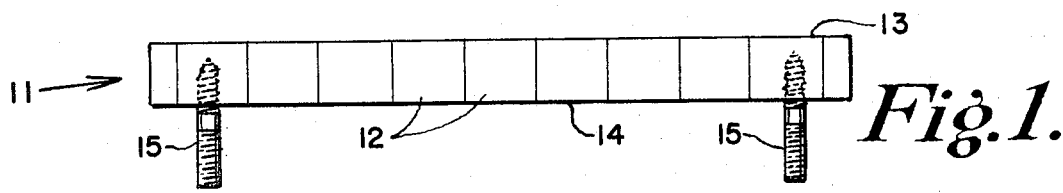
FIG. 1 is an end view of a preferred cutting board embodiment of the invention.
Figure 2:
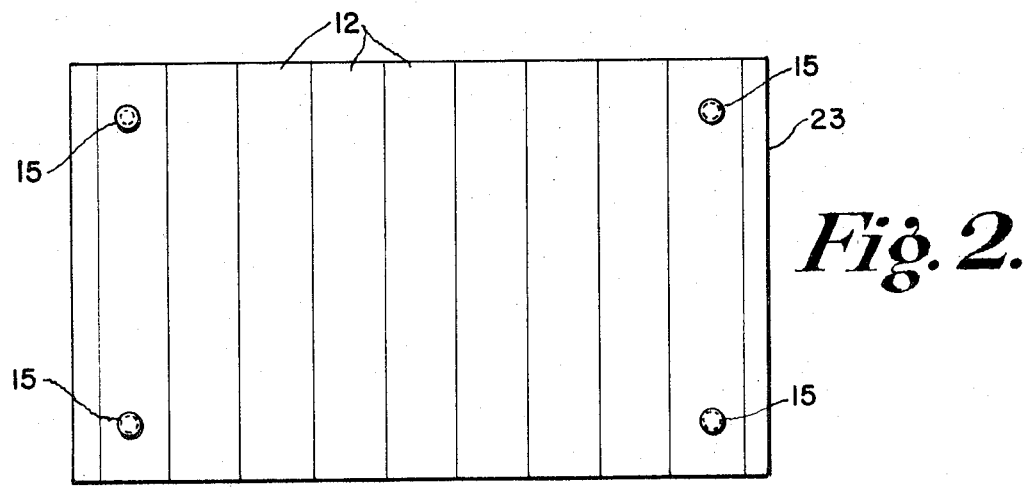
FIG. 2 is a bottom view of the cutting board shown in FIG. 1.

Referring now to FIGS. 1 and 2 there is shown a rectangular cutting board 11 having dimensions, for example, of 10-12 inches wide and 16-18 inches long. The board is composed of a plurality of laminated strips 12 of a suitable hardwood such as birch or maple. The top 13 of the cutting board 11 is smooth so as to provide a suitable surface for use in cutting, slicing or chopping food products such as meat, vegetables, bread, etc. Screwed into the bottom surface 14 of the cutting board 11 and extending perpendicularly therefrom at positions adjacent its corners are threaded studs 15 such as, for example, hanger bolts.

Figure 3:
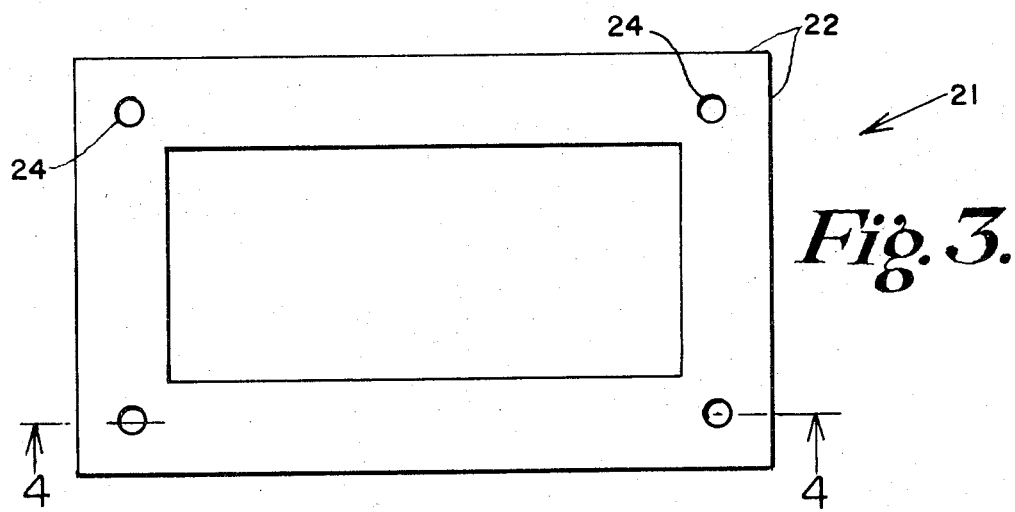
FIG. 3 is a plan view of a preferred gasket embodiment for use with the cutting board shown in FIGS. 1 and 2.

Shown in FIG. 3 is a rectangularly shaped annular gasket 21 integrally formed of a suitable non-porous material such as neoprene. A peripheral edge 22 of the gasket 21 conforms to the outer edge 23 of the cutting board 11 shown in FIGS. 1 and 2. Similarly, apertures 24 extend through the gasket 21 in locations that correspond to the positions of the studs 15 on the cutting board 11.

Figure 4:
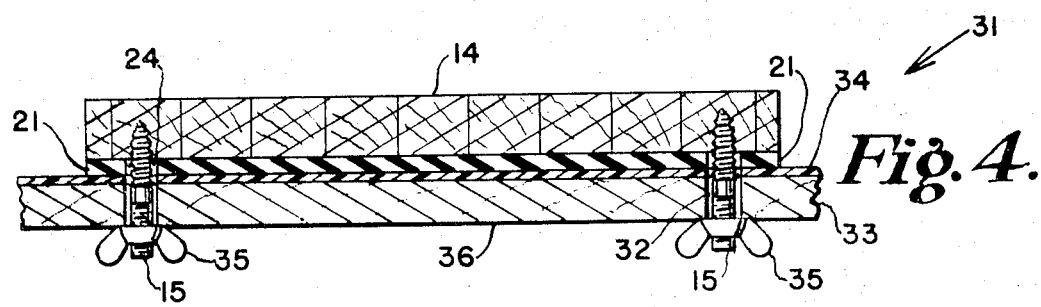
FIG. 4 is a cross sectional view showing the cutting board of FIGS. 1 and 2 and the gasket of FIG. 3 mounted on a kitchen counter.

In preferred use, the cutting board 11 and gasket 21 are mounted directly on a previously installed kitchen counter 31 partially shown in FIG. 4. During installation of the cutting board 11, a desired location is first selected on the counter top 31. Typically, a convenient location might be adjacent a garbage disposal in which unwanted byproducts such as peelings or fat could be disposed or near a stove on which food products prepared on the board would be cooked. In other cases a previously damaged portion of a counter might be selected for concealment. Next, the gasket 21 is placed on the counter top 31 in the selected location and used as a template while drilling holes 32 through both a base ply 33 composed, for example, of plywood and a finish ply 34 composed, for example, of Formica. After drilling is completed, the studs 15 are inserted through the holes 32 and the apertures 24 in the gasket 21. Although in that position the studs 15 restrain relative movement between the board 11 and the counter top 31 in a direction parallel thereto, additional stability in the vertical direction is obtained by tightening wing nuts 35 on the studs 15 against the undersurface 36 of the counter top 31. This prevents unwanted removal of the board 11. However, if at any time, removal of the board 11 becomes desirable, for example to resurface the top 14, such an operation is simply achieved by merely removing the wing nuts 35.

In addition to serving as a template in the manner described above, the gasket 21 serves other useful functions. Provision of a seal between the cutting board 11 and the counter top 31 prevents foreign matter from entry therebetween. The presence of such foreign matter clearly would be undesirable and could after prolonged periods encourage the growth of bacteria and associated illness or unpleasant odors. The gasket 21 also serves to compensate for any lack of conformity between the counter top 31 and the bottom surface 14 of the cutting board 11.

Obviously, many modifications and variations of the present invention are possible in light of the above teachings. For example only, restraining and securing mechanisms other than the studs 15 and wing nuts 35 and in geometrical arrangements other than those shown could be used to restrain and secure cutting boards of other shapes and sizes to the counter tops. Similarly, gaskets having shapes and made of materials other than those specifically described could be employed. It is to be understood, therefore, that the invention can be practiced otherwise than as specifically described.

What is claimed is:

1. Kitchen accessory apparatus comprising:
    a planar counter top comprising a base laminate and a plastic cover laminate, said counter top defining restraining openings extending therethrough;
    a cutting board mounted upon said counter top so as to have a substantial portion of said planar counter top surrounding said board, said cutting board comprising an upper surface for intercepting cutting instruments when foods are cut thereon, the height of said cutting board being substantially less than the length and width thereof;
    releasable means connected to said cutting board and adapted for accommodation by said restraining openings in said counter top so as to restrain relative movement therebetween in the plane defined by said counter top and to secure said cutting board to said counter top so as to prevent separation thereof; and
    gasket means for mounting between said cover laminate and said cutting board, said gasket means preventing ingress of foreign material from the portion of said cover laminate surrounding said cutting board onto the portion of said cover laminate beneath said cutting board.

2. Apparatus according to claim 1 wherein said cutting board is composed of laminated strips of wood.

3. Apparatus according to claim 1 wherein said gasket means is formed of a material nonabsorbent of moisture.

4. Apparatus according to claim 1 wherein said gasket means possesses a peripheral edge substantially conforming to the outer edge of said cutting board.

5. Apparatus according to claim 4 wherein said gasket means comprises a continuous annular gasket member.

6. Apparatus according to claim 1 wherein said releasable means includes restraining means comprising a plurality of studs fixed to the lower surface of said cutting board and extending in a substantially perpendicular direction therefrom, said studs adapted to penetrate said restraining openings in the counter top.

7. Apparatus according to claim 6 wherein said studs are threaded and said releasable means further includes securing means comprising a plurality of threaded units for engaging said studs and contacting said underside of the counter top.

8. Apparatus according to claim 7 wherein said cutting board is rectangular and said studs extend from positions adjacent each corner thereof.

9. Apparatus according to claim 8 wherein said gasket means possesses a peripheral edge substantially conforming to the outer edge of said cutting board.

10. Apparatus according to claim 9 wherein said gasket means comprises a continuous annular gasket member.

11. Apparatus according to claim 10 wherein said annular gasket member possesses mounting apertures that align with said studs.

* * * * *